(12) United States Patent
Yamada et al.

(10) Patent No.: US 12,731,076 B2
(45) Date of Patent: Sep. 8, 2026

(54) NON-TRANSITORY COMPUTER-READABLE RECORDING MEDIUM STORING TRAINING DATA GENERATION PROGRAM, TRAINING DATA GENERATION METHOD, AND TRAINING DATA GENERATION DEVICE

(71) Applicant: FUJITSU LIMITED, Kawasaki (JP)

(72) Inventors: Hiroaki Yamada, Kawasaki (JP); Takashi Yamazaki, Kawasaki (JP); Shohei Yamane, Kawasaki (JP); Takashi Kobayashi, Machida (JP); Yoichi Kochibe, Mihama (JP); Toshiyasu Ohara, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 831 days.

(21) Appl. No.: 18/193,724

(22) Filed: Mar. 31, 2023

(65) Prior Publication Data

US 2023/0252356 A1 Aug. 10, 2023

Related U.S. Application Data

(63) Continuation of application No. PCT/JP2020/037924, filed on Oct. 6, 2020.

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
(Continued)

(56) References Cited

U.S. PATENT DOCUMENTS

2019/0362044 A1 11/2019 Li et al.
2020/0074622 A1 3/2020 Yang et al.
(Continued)

FOREIGN PATENT DOCUMENTS

EP 3900870 A1 10/2021
JP H09-115101 A 5/1997
(Continued)

OTHER PUBLICATIONS

EESR—The Extended European Search Report of European Patent Application No. 20956698.3 dated Oct. 25, 2023. US2020/0110850 cited in the EESR was previously submitted in the IDS filed on Mar. 31, 2023.
(Continued)

*Primary Examiner* — Justin C Mikowski
(74) *Attorney, Agent, or Firm* — Fujitsu Intellectual Property Center

(57) ABSTRACT

A non-transitory computer-readable recording medium storing a training data generation program for causing a computer to perform processing including: obtaining circuit information; determining whether or not a relationship between a distance between two lines included in the circuit information and a distance between the two lines and a GND layer satisfies a condition; when the relationship satisfies the condition, generating first current distribution information associated with the two lines by simulation and generating training data for machine learning based on the first current distribution information; and when the relationship does not satisfy the condition, generating second current distribution information associated with the two lines by synthesizing pieces of current distribution information associated with the respective two lines and generating the training data for machine learning based on the second current distribution information.

15 Claims, 14 Drawing Sheets

(58) Field of Classification Search
USPC .......................................................... 703/14
See application file for complete search history.

(56) References Cited

U.S. PATENT DOCUMENTS

| | | | | |
|---|---|---|---|---|
| 2020/0110850 | A1 | 4/2020 | Yamane et al. | |
| 2022/0138381 | A1* | 5/2022 | Yamane | G06F 30/367 716/110 |
| 2022/0269279 | A1* | 8/2022 | Redford | G05D 1/0221 |
| 2023/0222336 | A1* | 7/2023 | Redford | G06N 3/048 706/20 |

FOREIGN PATENT DOCUMENTS

| | | | |
|---|---|---|---|
| JP | 2020-32190 | A | 3/2020 |
| JP | 2020-060877 | A | 4/2020 |
| WO | 2020/095362 | A1 | 5/2020 |
| WO | 2020/129617 | A1 | 6/2020 |

OTHER PUBLICATIONS

Jin Hang et al., "EMI Radiation Prediction and Structure Optimization of Packages by Deep Learning", IEEE Access, vol. 7, Jul. 10, 2019, pp. 93772-93780, XP011736497, DOI: 10.1109/ACCESS.2019.2927160.

International Search Report and Written Opinion of the International Searching Authority (Form PCT/ISA/210, 220, and 237), mailed in connection with PCT/JP2020/037924 and mailed Dec. 1, 2020 (Total 10 pages).

* cited by examiner

FIG. 1

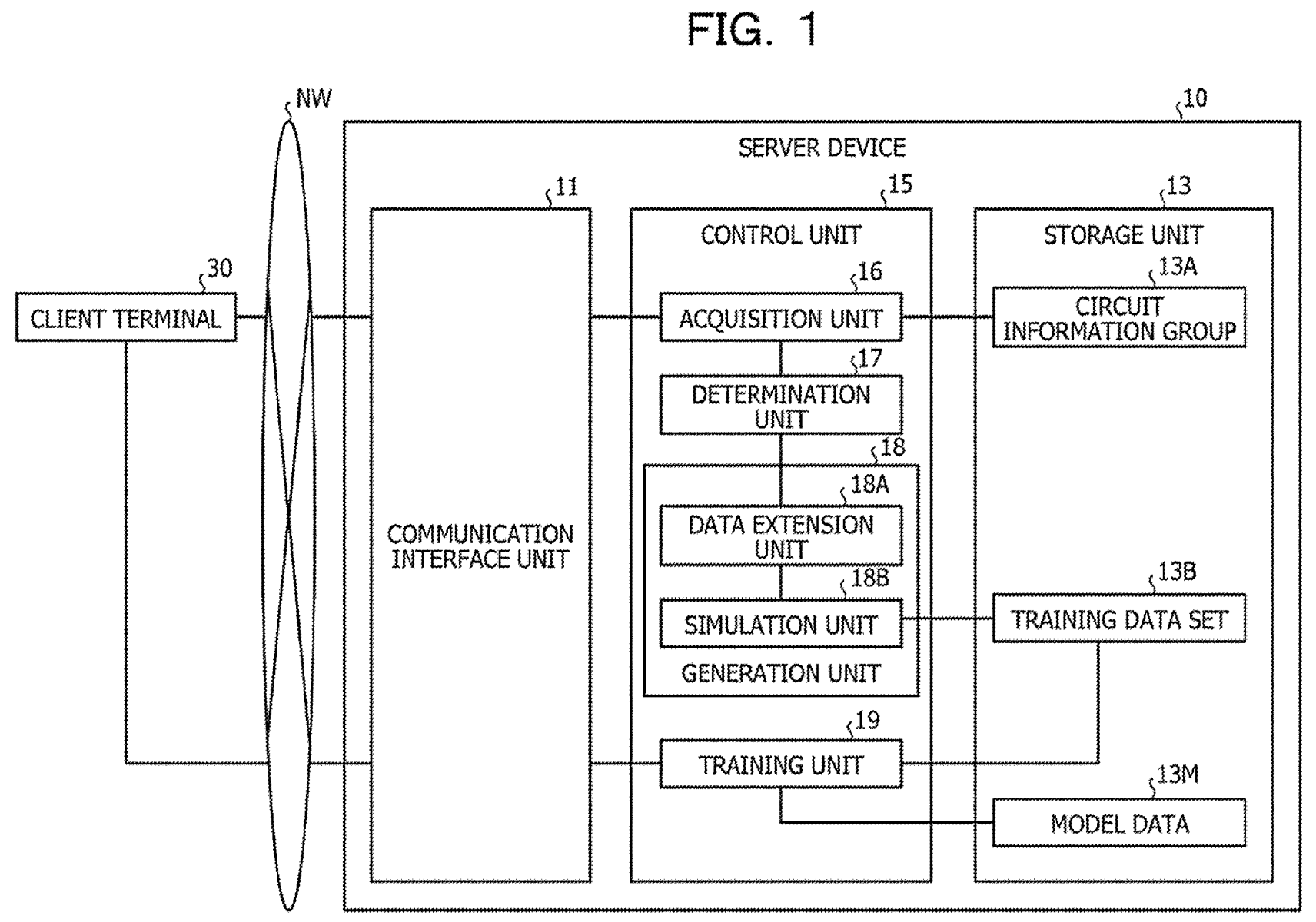

10 SERVER DEVICE

13 STORAGE UNIT

13A CIRCUIT INFORMATION GROUP

13B TRAINING DATA SET

13M MODEL DATA

15 CONTROL UNIT

16 ACQUISITION UNIT

17 DETERMINATION UNIT

18 GENERATION UNIT

18A DATA EXTENSION UNIT

18B SIMULATION UNIT

19 TRAINING UNIT

11 COMMUNICATION INTERFACE UNIT

NW

30 CLIENT TERMINAL

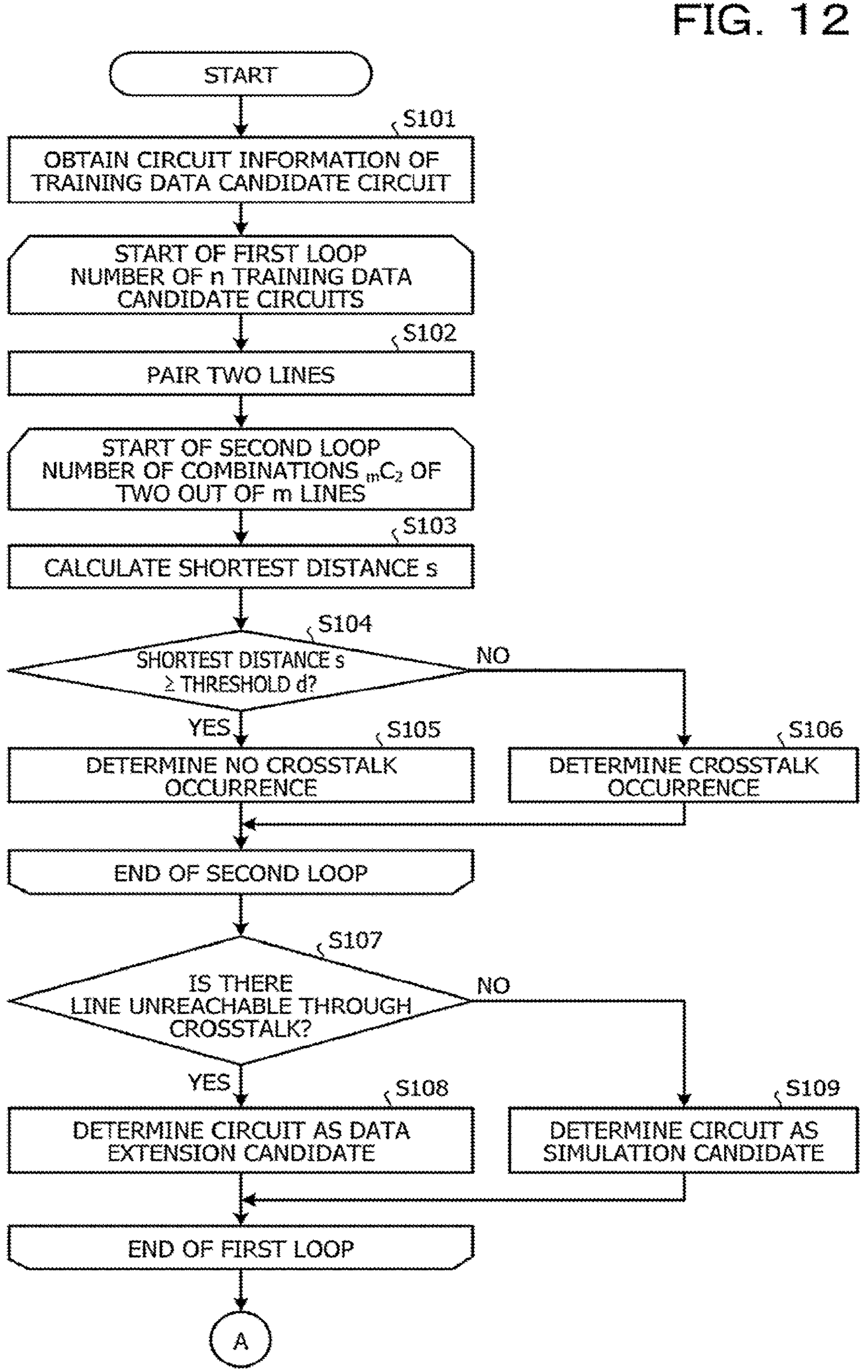
FIG. 12
START
S101
OBTAIN CIRCUIT INFORMATION OF TRAINING DATA CANDIDATE CIRCUIT
START OF FIRST LOOP NUMBER OF n TRAINING DATA CANDIDATE CIRCUITS
S102
PAIR TWO LINES
START OF SECOND LOOP NUMBER OF COMBINATIONS $_mC_2$ OF TWO OUT OF m LINES
S103
CALCULATE SHORTEST DISTANCE s
S104
SHORTEST DISTANCE s ≥ THRESHOLD d?
NO
YES
S105
DETERMINE NO CROSSTALK OCCURRENCE
S106
DETERMINE CROSSTALK OCCURRENCE
END OF SECOND LOOP
S107
IS THERE LINE UNREACHABLE THROUGH CROSSTALK?
NO
YES
S108
DETERMINE CIRCUIT AS DATA EXTENSION CANDIDATE
S109
DETERMINE CIRCUIT AS SIMULATION CANDIDATE
END OF FIRST LOOP
A

NON-TRANSITORY COMPUTER-READABLE RECORDING MEDIUM STORING TRAINING DATA GENERATION PROGRAM, TRAINING DATA GENERATION METHOD, AND TRAINING DATA GENERATION DEVICE

CROSS-REFERENCE TO RELATED APPLICATION

This application is a continuation application of International Application PCT/JP2020/037924 filed on Oct. 6, 2020 and designated the U.S., the entire contents of which are incorporated herein by reference.

FIELD

The present disclosure relates to a training data generation technique.

BACKGROUND

Machine learning technology is used for electromagnetic interference (EMI) prediction in electronic circuits. Here, the EMI refers to an emission state of electromagnetic waves emitted from an electronic circuit. Furthermore, the EMI is also called a far field from the aspect of referring to a state of a distant electromagnetic field of the electromagnetic wave emission state.

For example, EMI intensity in a prediction target circuit is predicted using a trained machine learning model generated from training data in which circuit information is associated with a simulation result of electromagnetic wave analysis for the circuit information.

Examples of the related art include: [Patent Document 1] Japanese Laid-open Patent Publication No. 9-115101; [Patent Document 2] Japanese Laid-open Patent Publication No. 2020-32190; and [Patent Document 3] International Publication Pamphlet No. WO 2020/129617.

SUMMARY

According to an aspect of the embodiments, there is provided a non-transitory computer-readable recording medium storing a training data generation program for causing a computer to perform processing including: obtaining circuit information; determining whether or not a relationship between a distance between two lines included in the circuit information and a distance between the two lines and a GND layer satisfies a condition; when the relationship satisfies the condition, generating first current distribution information associated with the two lines by simulation and generating training data for machine learning based on the first current distribution information; and when the relationship does not satisfy the condition, generating second current distribution information associated with the two lines by synthesizing pieces of current distribution information associated with the respective two lines and generating the training data for machine learning based on the second current distribution information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram illustrating an exemplary functional configuration of a server device according to a first embodiment;

FIG. 12 is a flowchart (1) illustrating a procedure of a training data generation process according to the first embodiment;

DESCRIPTION OF EMBODIMENTS

Figure 2:
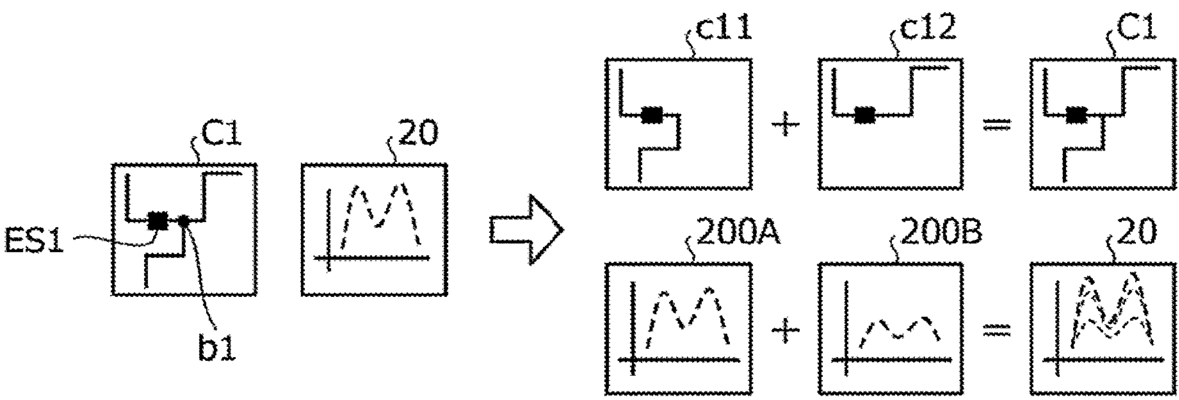
FIG. 2 is a diagram illustrating examples of a simple circuit and a complex circuit.

However, in the case of predicting the EMI intensity using the machine learning model described above, variations of the prediction target circuit increase as the number of lines in the circuit increases, resulting in an enormous amount of calculation at a time of training data generation.

In one aspect, an object of the present disclosure is to provide a training data generation program, a training data generation method, and a training data generation device capable of reducing an amount of calculation at a time of training data generation.

Hereinafter, a training data generation program, a training data generation method, and a training data generation device according to the present application will be described with reference to the accompanying drawings. Note that those embodiments do not limit the disclosed technique. Additionally, each of the embodiments may be appropriately combined within a range that does not cause contradiction between processing contents.

First Embodiment

FIG. 1 is a block diagram illustrating an exemplary functional configuration of a server device 10 according to a first embodiment. The server device 10 illustrated in FIG. 1 is an exemplary computer that provides a training data generation function of generating training data to be used to train a machine learning model for predicting EMI intensity in an electronic circuit. Hereinafter, a machine learning model for predicting EMI intensity in an electronic circuit may be referred to as an "EMI prediction model".

Such a training data generation function may be packaged as one function of a machine learning service that carries out machine learning of the EMI prediction model using the training data described above. In addition, the training data generation function described above or the machine learning service described above may be packaged as one function of a model providing service that provides a trained EMI prediction model or an EMI prediction service that predicts EMI intensity of a circuit using a trained EMI prediction model. Moreover, the model providing service described above or the EMI prediction service described above may be packaged as one function of a simulation service that conducts electromagnetic wave analysis simulation.

For example, the server device 10 may be implemented by a training data generation program for implementing the training data generation function described above being installed in any computer. As an example, the server device 10 may be implemented as a server that provides the training data generation function described above on-premise. As another example, the server device 10 may be implemented as an application of a Software as a Service (SaaS) type to provide the training data generation function described above as a cloud service.

Furthermore, as illustrated in FIG. 1, the server device 10 may be communicably coupled to a client terminal 30 via a network NW. For example, the network NW may be any type of communication network such as the Internet, a local area network (LAN), or the like regardless of whether it is wired or wireless.

The client terminal 30 is an exemplary computer that receives provision of the training data generation function described above. For example, a desktop computer, such as a personal computer, or the like may correspond to the client terminal 30. This is merely an example, and the client terminal 30 may be any computer, such as a laptop computer, a mobile terminal device, a wearable terminal, or the like.

Note that, although FIG. 1 illustrates an example in which the training data generation function described above is provided by a client-server system, it not limited to this example, and the training data generation function described above may be provided in a standalone manner.

In one aspect, the EMI prediction described above is useful for design of an electronic circuit board, which is what is called circuit design. That is, in the circuit design, there is great interest in keeping radiated electromagnetic waves observed in a circuit within a prescribed value determined for each frequency from the standpoint of standards and legal regulations. In view of the above, in the circuit design, the EMI prediction is made by the electromagnetic wave analysis simulation. However, factors such as a circuit modeling cost, a simulator calculation cost, and the like are hurdles for conducting the simulation.

Against such a background, for example, machine learning techniques of a neural network, such as a convolutional neural network (CNN), are used. For example, as described in the background art section above, the EMI intensity in an analysis target circuit is predicted using a trained EMI prediction model generated from training data in which circuit information is associated with a simulation result of electromagnetic wave analysis for the circuit information.

In the case of predicting the EMI intensity of the circuit using the EMI prediction model in this manner, a condition for the EMI prediction accuracy to reach a certain level is that training data obtained by extracting circuit characteristics that affect the EMI is used to train the EMI prediction model.

However, there are various kinds of circuit characteristics that affect the EMI. Examples thereof include a shape of a line arranged on the circuit, and arrangement of elements on a circuit line, such as a resistor, a coil, a capacitor, and the like. Therefore, an enormous amount of training data is needed for the training of the EMI prediction described above.

In view of the above, first advanced technology and second advanced technology are available as technology for achieving reduction of the number of pieces of training data. The first advanced technology and the second advanced technology referred to here are distinguished from the prior art disclosed in publicly known patent documents, non-patent documents, and the like.

In the first advanced technology, a circuit is classified into a "simple circuit" or a "complex circuit" depending on whether or not a line wired in the circuit branches. For example, among circuits, a circuit with no branch is classified as a "simple circuit", whereas a circuit with a branch is classified as a "complex circuit". According to such classification, in the first advanced technology, a point of view that a complex circuit may be expressed as a combination of simple circuits is utilized to solve the problem of reducing the number of pieces of training data.

FIG. 2 is a diagram illustrating examples of the simple circuit and the complex circuit. FIG. 2 illustrates a complex circuit C1 as an example, and also illustrates a simple circuit c11 and a simple circuit c12 as an exemplary combination of simple circuits corresponding to the complex circuit C1. As illustrated in FIG. 2, the complex circuit C1 may be divided into the simple circuit c11 and the simple circuit c12 with a branch point b1 as a boundary. In this case, among three partial lines branching from the branch point b1, combinations of a partial line including an excitation source ES1 and each of partial lines not including the excitation source ES1 are used as the lines of the simple circuit c11 and the simple circuit c12 to divide the complex circuit C1. Not only the complex circuit C1 is obtained by those simple circuit c11 and simple circuit c12 being synthesized, but also an EMI intensity 20 of the complex circuit C1 is obtained by an EMI intensity 200A of the simple circuit c11 and an EMI intensity 200B of the simple circuit c12 being synthesized.

Figure 3:
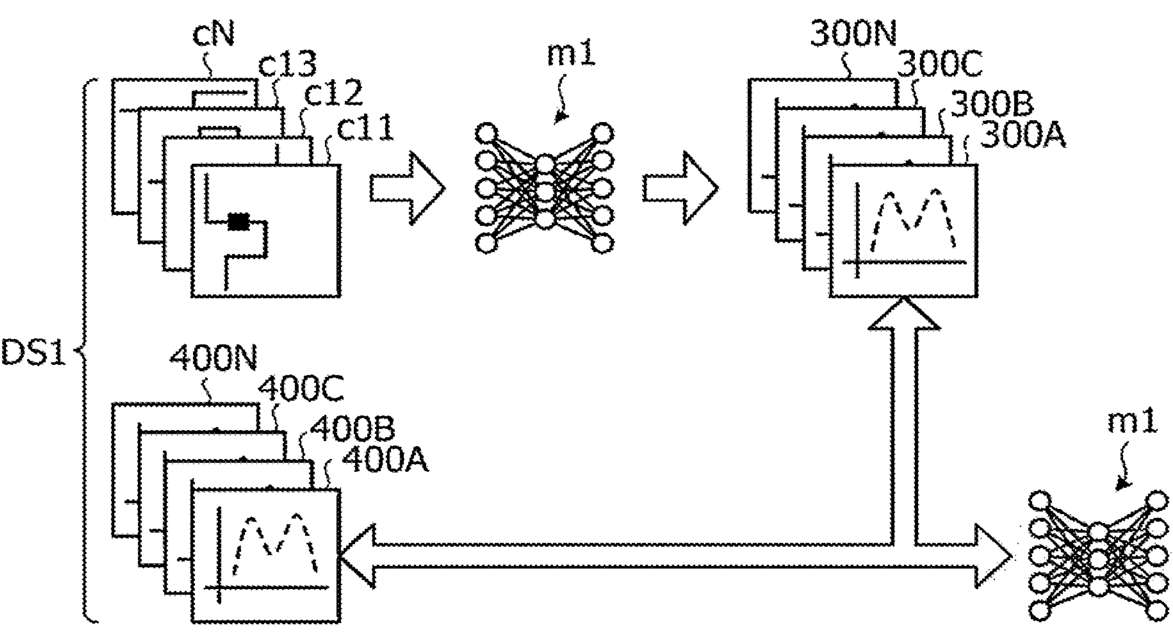
FIG. 3 is a diagram illustrating an exemplary machine learning method for an EMI prediction model.

FIG. 3 is a diagram illustrating an exemplary machine learning method for the EMI prediction model. As illustrated in FIG. 3, training data set DS1 is used for machine learning of an EMI prediction model M1. For example, the training data set DS1 is a set of training data in which pieces of circuit information of simple circuits c11 to cN are associated with EMI intensities 400A to 400N observed in the respective simple circuits c11 to cN. The "circuit information" referred to here may include information regarding a circuit network of elements included in an electronic circuit, such as a netlist. Furthermore, the "EMI intensity" referred to here may be, as merely an example, EMI intensity distribution in a specific frequency domain, which is what is called an EMI spectrum.

For example, when the circuit information of the simple circuit c11 is input to the EMI prediction model m1, an EMI intensity 300A is output from the EMI prediction model m1. Similarly, with the pieces of circuit information of the simple circuits c12 to cN being input to the EMI prediction model m1, outputs of EMI intensities 300B to 300N are obtained from the EMI prediction model m1. Then, parameters of the EMI prediction model m1 are updated based on the loss between the EMI intensities 300B to 300N, which are the outputs of the EMI prediction model m1, and the EMI intensities 400A to 400N of ground truth labels. In this manner, machine learning of the EMI prediction model m1 is carried out using the pieces of circuit information of the simple circuits c11 to cN as features, which are what are called explanatory variables, and the EMI intensity as an objective variable. As a result, a trained EMI prediction model M1 that implements EMI prediction for simple circuits is obtained.

Figure 4:
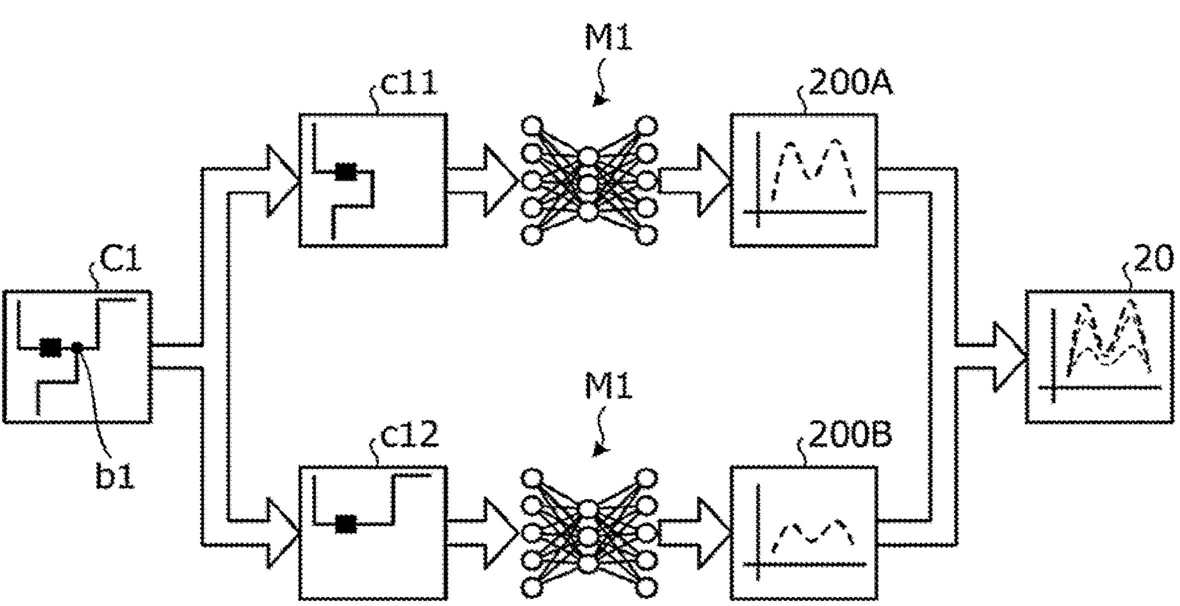
FIG. 4 is a diagram illustrating exemplary EMI prediction for the complex circuit.

FIG. 4 is a diagram illustrating exemplary EMI prediction for a complex circuit. FIG. 4 illustrates, as an example, a case of predicting the EMI intensity of the complex circuit C1 using the trained EMI prediction model M1 illustrated in FIG. 3. As illustrated in FIG. 4, when the complex circuit C1 is a prediction target, the complex circuit C1 is divided into the simple circuit c11 and the simple circuit c12 with the branch point b1 as a boundary. Thereafter, EMI prediction for the simple circuit c11 and EMI prediction for the simple circuit c12 are performed in parallel. That is, with the circuit information of the simple circuit c11 being input to the EMI prediction model M1, an EMI intensity estimated value 200A is obtained as an output of the EMI prediction model M1. Furthermore, with the circuit information of the simple circuit c12 being input to the EMI prediction model M1, an EMI intensity estimated value 200B is obtained as an output of the EMI prediction model M1. With those EMI intensity estimated value 200A and EMI intensity estimated value 200B being synthesized, an EMI intensity estimated value 20 of the complex circuit C1 is obtained.

In this manner, according to the first advanced technology, results of EMI prediction for simple circuits using the EMI prediction model M1 for simple circuits are synthesized, whereby EMI prediction for a complex circuit may be implemented. Thus, according to the first advanced technology, it becomes possible to reduce training data for a complex circuit. Moreover, according to the first advanced technology, the effect of reducing the number of pieces of training data is enhanced as the EMI prediction model domain has a larger number of circuit line branch patterns.

Next, the second advanced technology has one point of view that a circuit with elements having LCR elements such as an inductor (L), a capacitor (C), a resistor (R), and the like may be expressed by a combination of two patterns including a pattern in which current is reflected by the elements and a pattern in which current is not reflected by the elements. Hereinafter, among current components flowing through the circuit with elements, a current component reflected by the elements may be referred to as a “reflection component”, and a current component not reflected by the elements may be referred to as a “non-reflection component”.

For example, according to the second advanced technology, a circuit with elements is divided into a reflection-equivalent circuit and a non-reflection-equivalent circuit. The “reflection-equivalent circuit” referred to here indicates a circuit whose wiring is a line of a part where current is observed in the wiring of the circuit with elements under the condition that the ratio between the reflection component and the non-reflection component is 1:0, in other words, the condition that the non-reflection component is not observed and only the reflection component is observed. On the other hand, the “non-reflection-equivalent circuit” referred to here indicates a circuit whose wiring is a line of a part where current is observed in the wiring of the circuit with elements under the condition that the ratio between the reflection component and the non-reflection component is 0:1, in other words, the condition that the reflection component is not observed and only the non-reflection component is observed.

Besides, according to the second advanced technology, machine learning of an EMI prediction model m2 is carried out by narrowing down one circuit with an element to two circuits including a reflection-equivalent circuit and a non-reflection-equivalent circuit. At this time, an explanatory variable of the EMI prediction model m2 may be set to current distribution calculated from the circuit information of the reflection-equivalent circuit or the circuit information of the non-reflection-equivalent circuit. The “circuit information” referred to here may include information regarding a circuit network of elements included in an electronic circuit, such as a netlist, as well as a physical property value of each element such as a resistance value, inductance, capacitance, or the like. For example, while all current distributions calculated for each frequency component included in the frequency domain may be used for the machine learning of the EMI prediction model m2, a current distribution of a resonance frequency may be used as a current distribution representing the frequency domain, and details thereof will be described later. Parameters of the EMI prediction model m2 are updated based on the loss between the output of the EMI prediction model m1 obtained by inputting the current distribution of the reflection-equivalent circuit or the non-reflection-equivalent circuit obtained in this manner to the EMI prediction model m2 and the EMI intensity of the ground truth label. As a result, an EMI prediction model M2 is obtained in which only the reflection-equivalent circuit and the non-reflection-equivalent circuit have been trained.

Here, in the second advanced technology, the following reference data is generated as reference data to be referred to at the time of EMI prediction for the circuit with elements from the aspect of implementing the EMI prediction for the circuit with elements by synthesizing the reflection-equivalent circuit and the non-reflection-equivalent circuit.

For example, as the reference data, a lookup table, a function, or the like that defines a correspondence relationship between a physical property value of an element arranged in the circuit with elements and the ratio of the reflection component and the non-reflection component may be used. As merely an example, reflection occurs in a region where a value of the inductor (L) is notable large, a region where a value of the capacitor (C) is notable small, and a region where a value of the resistor (R) is notable large. On the other hand, reflection is sufficiently small in regions other than those.

As merely an example, an exemplary case where the reference data is generated from a circuit in which the capacitor (C) is arranged will be described. In this case, a physical property value of an element having a ratio of 1:0 between the reflection component and the non-reflection component and a physical property value of an element having a ratio of 0:1 between the reflection component and the non-reflection component are searched for. For example, under the condition that the capacitance of the capacitor (C) is 1 nF, the reflection component is not observed, and only the non-reflection component is observed. In this case, the capacitance “1 nF” of the capacitor (C) is associated with the reflection component “0” and the non-reflection component “1”. Furthermore, under the condition that the capacitance of the capacitor (C) is 1 pF, the reflection component and the non-reflection component are observed at an equivalent rate. In this case, the capacitance “1 pF” of the capacitor (C) is associated with the reflection component “0.5” and the non-reflection component “0.5”. Moreover, under the condition that the capacitance of the capacitor (C) is 100 fF, the non-reflection component is not observed, and only the reflection component is observed. In this case, the capacitance “1 fF” of the capacitor (C) is associated with the reflection component "1" and the non-reflection component "0". Those correspondence relationships are generated as reference data. Note that, while the ratio between the reflection component and the non-reflection component corresponding to 1 pF in the capacitance range of the capacitor (C) from 100 fF to 1 nF has been taken as an example here, any number of correspondence relationships may be defined.

Figure 5:
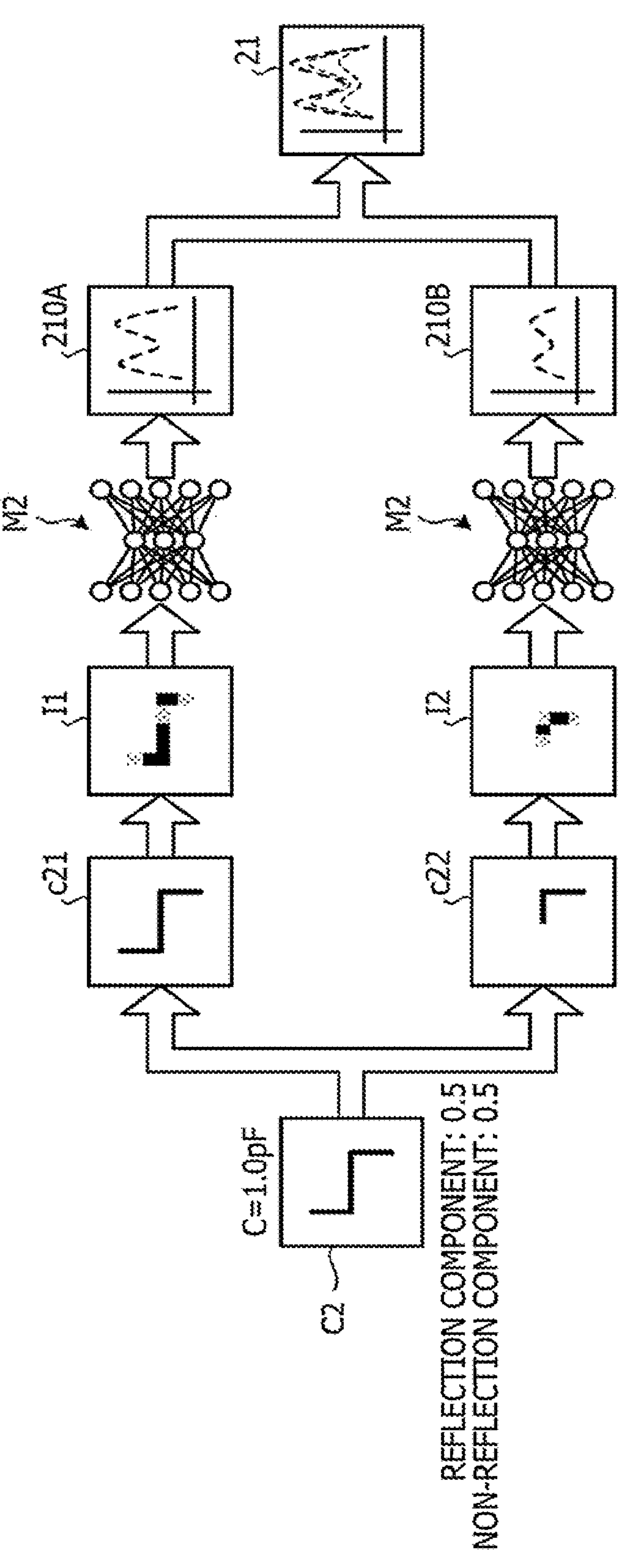
FIG. 5 is a diagram illustrating exemplary EMI prediction for a circuit with elements.

Under the state where those trained EMI prediction model M2 and reference data are obtained, the EMI prediction for the circuit with elements may be implemented according to the second advanced technology. FIG. 5 is a diagram illustrating exemplary EMI prediction for the circuit with elements. FIG. 5 illustrates, as an example, a case of predicting the EMI intensity of a circuit with elements C2 using the trained EMI prediction model M2. As illustrated in FIG. 5, when the circuit with elements C2 is a prediction target, a ratio "0.5:0.5" between the reflection component and the non-reflection component corresponding to the capacitance "1.0 pF" of the capacitor (C) included in the circuit information of the circuit with elements C2 is referred to from the reference data. Then, the circuit with elements C2 is divided into a reflection-equivalent circuit c21 and a non-reflection-equivalent circuit c22.

Thereafter, EMI prediction for the reflection-equivalent circuit c21 and EMI prediction for the non-reflection-equivalent circuit c22 are performed in parallel. That is, with the circuit information of the reflection-equivalent circuit c21 being input to a circuit simulator, current distribution I1 of the reflection-equivalent circuit c21 is calculated. With the current distribution I1 of the reflection-equivalent circuit c21 calculated in this manner being input to the EMI prediction model M2, an estimated value 210A of the EMI intensity is obtained as an output of the EMI prediction model M2. Furthermore, with the circuit information of the non-reflection-equivalent circuit c22 being input to the circuit simulator, current distribution I2 of the non-reflection-equivalent circuit c22 is calculated. With the current distribution I2 of the non-reflection-equivalent circuit c22 calculated in this manner being input to the EMI prediction model M2, an estimated value 210B of the EMI intensity is obtained as an output of the EMI prediction model M2. With those EMI intensity estimated value 210A and EMI intensity estimated value 210B being synthesized according to the ratio "0.5:0.5" between the reflection component and the non-reflection component referred to from the reference data, an EMI intensity estimated value 21 of the circuit with elements C2 is obtained.

In this manner, according to the second advanced technology, results of EMI prediction for a reflection-equivalent circuit and a non-reflection-equivalent circuit are synthesized, whereby EMI prediction for a circuit with elements may be implemented. Thus, according to the second advanced technology, it becomes possible to reduce training data for a circuit other than the two circuits including the reflection-equivalent circuit and the non-reflection-equivalent circuit for one circuit with an element. Moreover, according to the second advanced technology, the effect of reducing the number of pieces of training data is enhanced as the EMI prediction model domain has a larger number of elements arranged in the circuit and their physical property values.

However, since the division and the synthesis exemplified in the first advanced technology and the second advanced technology only support single-line branch circuits and circuits with elements, it is difficult to apply them to multiple-line circuits.

That is, a phenomenon called crosstalk may occur in a circuit in which multiple lines are adjacent on a basal plate. The "crosstalk" referred to here indicates electromagnetic coupling caused by one of two causes including capacitive coupling and inductive coupling.

Figure 6:
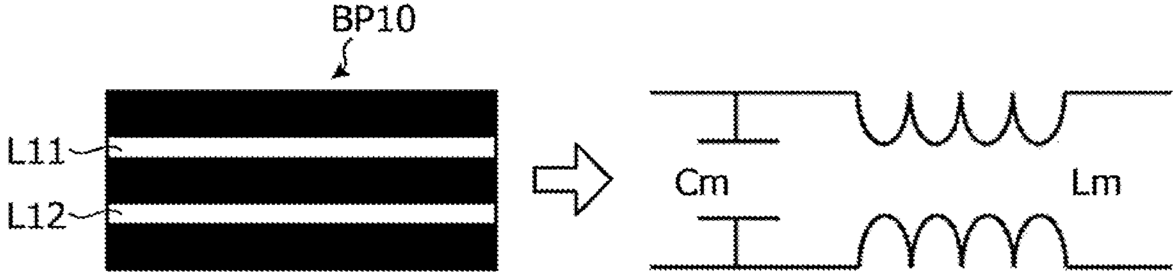
FIG. 6 is a diagram illustrating an exemplary variation of substrate properties.

FIG. 6 is a diagram illustrating an example of crosstalk occurrence. FIG. 6 illustrates a top view of a basal plate BP10. As illustrated in FIG. 6, the basal plate BP10 includes two lines L11 and L12. Those lines L11 and L12 are not coupled as circuit wiring. For example, when capacitive coupling occurs, a virtual capacitor called mutual capacitance Cm is formed. Furthermore, when inductive coupling occurs, a virtual coil called mutual inductance Lm is formed. When the crosstalk occurs as described above, those mutual capacitance Cm and mutual inductance Lm are electromagnetically coupled to each other. In this case, characteristic impedance of the lines L11 and L12 changes. Moreover, as the characteristic impedance changes, current in the lines L11 and L12 also changes, resulting in a change in the EMI. Thus, since the lines L11 and L12 in which the crosstalk occurs are not equivalent to the single-line synthesis, the division and the synthesis exemplified in the first advanced technology and the second advanced technology may not be applied.

Having said that, when the domain to which the task of the EMI prediction model described above is applied is narrowed down to single-line circuits, prediction accuracy may be lowered. For example, in a case where only one line of a multiple-line circuit is supported, current generated in other lines is ignored, which lowers the EMI prediction accuracy. In view of the above, in an attempt to include a multiple-line circuit in the domain to which the task of the EMI prediction model described above is applied, variations of the prediction target circuit increases.

That is, in regression classification tasks in supervised learning, it is a principle that a training data set including a wide range of instances that may be predicted is created and the training data set is used to train a machine learning model.

For example, in a case of generating an EMI prediction model for a circuit having a maximum of k lines, there are variations such as various shapes of one line, various shapes of two lines, various shapes of k lines, and the like. A training data set including a wide range of shapes that may be predicted in this manner needs to be generated.

However, as the number of lines in the circuit increases, the variation of the prediction target circuit increases. For example, in a case of predicting a target with approximately 10,000 variations in the single-line shape, 1,000 pieces of training data are basically sampled as merely an example. In this case, in a case of predicting a target with approximately 10,000 variations in the shape of each line of one to three lines, 1,003,003,000 pieces are needed to sample 1,000 pieces of training data for each line including combinations of one to three lines. As the number of pieces of training data increases in this manner, a modeling cost of circuit information to be input to the circuit simulator and the circuit simulator calculation cost also increase.

In view of the above, the training data generation function according to the present embodiment generates training data by switching whether to generate current distributions of two lines by simulation or to synthesize current distributions of the respective lines depending on a ratio between a distance between the two lines and a distance between the two lines and a GND layer.

Figure 7:
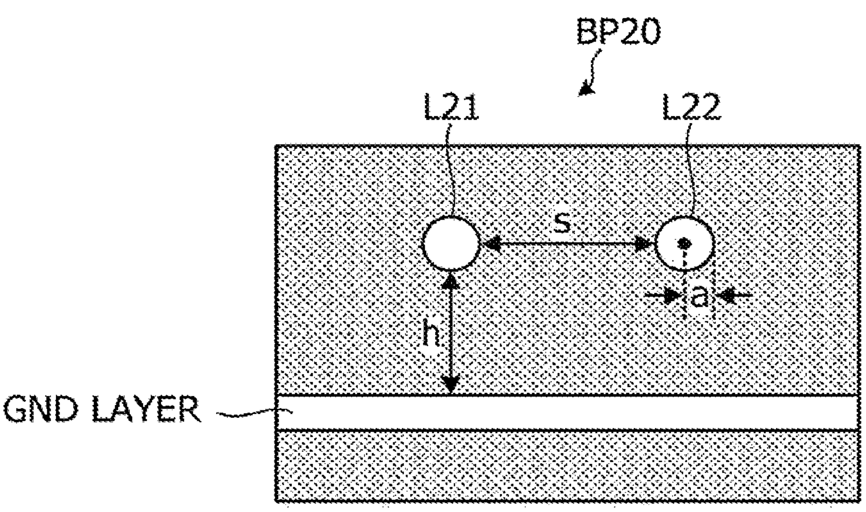
FIG. 7 is a diagram schematically illustrating a geometry of a circuit.

One point of view in the present embodiment is that whether or not crosstalk occurs between two lines may be determined from a circuit geometry. FIG. 7 is a diagram schematically illustrating a circuit geometry. FIG. 7 illustrates a side view of a basal plate BP20 with two lines L21 and L22 arranged in parallel over a GND layer. Values of mutual capacitance (Cm) and mutual inductance (Lm) formed between the lines L21 and L22 at a time of crosstalk occurrence are determined based on a distance s between the lines L21 and L22 and a distance h between the lines L21 and L22 and the GND layer.

An equation for calculating the mutual inductance (Lm) is expressed by the following equation (1). In the equation (1) set out below, "μ" represents a magnetic constant. Furthermore, an equation for calculating the mutual capacitance (Cm) is expressed by the following equation (2). In the equation (2) set out below, "ε" represents a permittivity. Moreover, "F" in the equation (2) set out below is expressed by the following equation (3). Moreover, "Fm" in the equations (1) and (2) set out below is expressed by the following equation (4).

[Equation 1]

$$L_m = \frac{\mu}{2\pi} F_m \quad \text{Equation (1)}$$

[Equation 2]

$$C_m = 2\pi\varepsilon \frac{F_m}{F^2 - F_m^2} \quad \text{Equation (2)}$$

[Equation 3]

$$F = \log\left(\frac{2h}{a}\right) \quad \text{Equation (3)}$$

[Equation 4]

$$F_m = \log\left(\sqrt{1 + \left(\frac{2h}{s}\right)^2}\right) \quad \text{Equation (4)}$$

According to the equation (1) mentioned above, it is clear that there is a relationship in which Lm approaches 0 as the distance s between the two lines L21 and L22 increases compared to the distance h to the GND layer. When Lm=0, it is equivalent to the case where no virtual coil is formed. Furthermore, according to the equation (2) mentioned above, it is clear that there is a relationship in which Cm approaches 0 as the distance s between the two lines L21 and L22 increases compared to the distance h to the GND layer. When Cm=0, it is equivalent to the case where no virtual capacitor is formed.

From those facts, when the relationship between the distance s and the distance h satisfies a condition, for example, when the ratio between the distance s and the distance h is equal to or higher than a threshold, it may be determined that no crosstalk occurs, whereas it may be determined that crosstalk occurs when the above-described relationship does not satisfy the above-described condition.

Moreover, the present embodiment has one point of view that lines in which no crosstalk occurs may be regarded as a combination of individual lines. With this point of view, motivation may be achieved to perform data extension for synthesizing current distributions individually calculated from individual lines previously instead of simulation for calculating current distributions of two lines not coupled by crosstalk.

Figure 8:
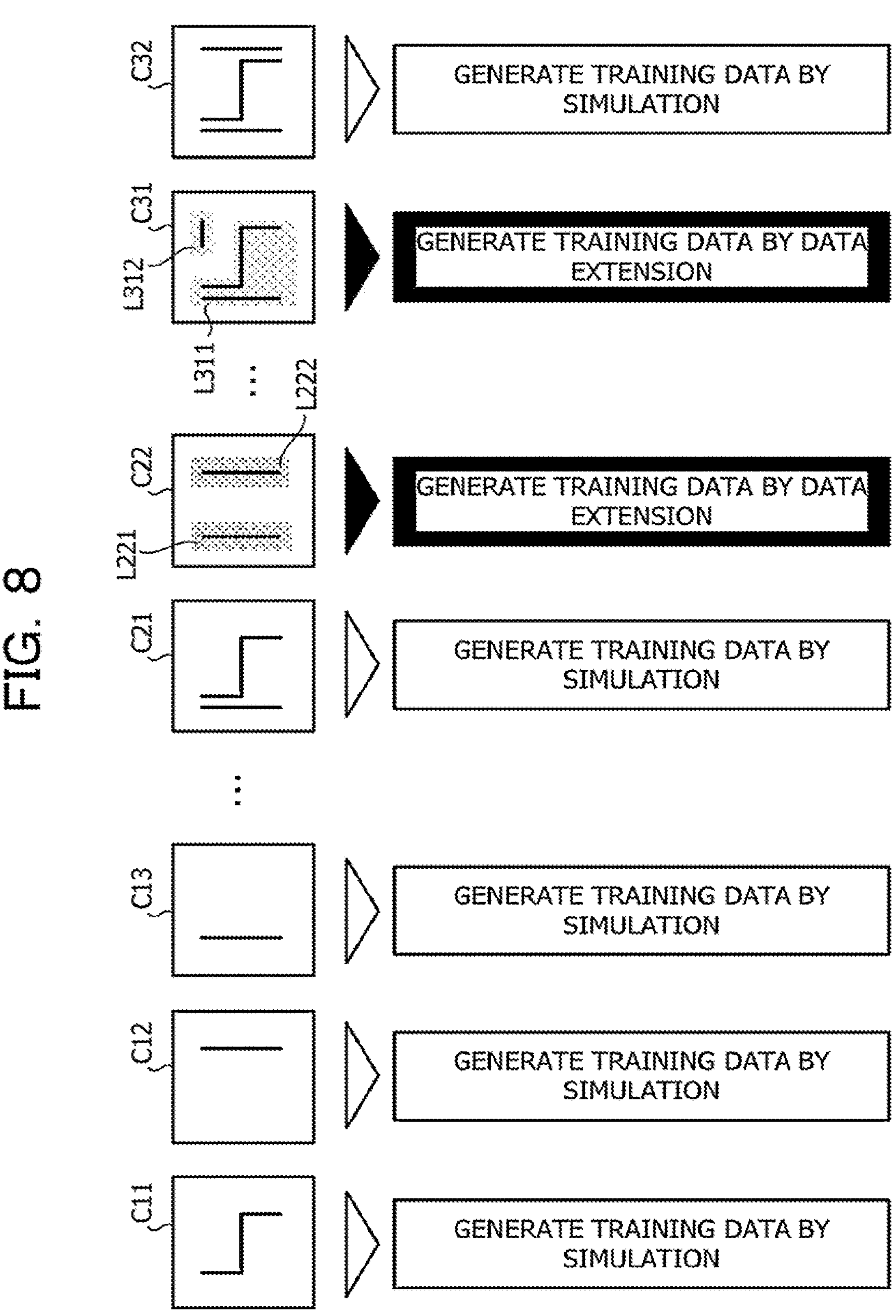
FIG. 8 is a diagram illustrating application examples of simulation and data extension.

FIG. 8 is a diagram illustrating application examples of simulation and data extension. FIG. 8 illustrates, as merely an example, an exemplary case where training data is generated from variations in the shape of each line of one to three lines. Moreover, in FIG. 8, circuits C11 to C13 are selectively illustrated as variations of the single-line shape. Moreover, in FIG. 8, circuits C21 and C22 are selectively illustrated as variations of the two-line shape, and circuits C31 and C32 are selectively illustrated as variations of the three-line shape. Note that FIG. 8 illustrates, among multiple-line circuits, combinations of lines not coupled to each other through crosstalk are indicated by hatching.

For example, in the example illustrated in FIG. 8, the circuit C11 is a single-line circuit, and thus no data extension option is available. Thus, the circuit information of the circuit C11 is input to the circuit simulator to conduct simulation for calculating current distribution of the circuit C11. Then, training data is generated from the current distribution of the circuit C11 calculated by the simulation. Furthermore, since the circuit C12 is also a single-line circuit in a similar manner to the circuit C11, training data is generated from current distribution of the circuit C12 calculated by simulation in a similar manner to the circuit C11. Moreover, since the circuit C13 is also a single-line circuit in a similar manner to the circuit C11, training data is generated from current distribution of the circuit C13 calculated by simulation in a similar manner to the circuit C11.

In the circuit C21, crosstalk occurs between the two lines. In this case, the circuit information of the circuit C21 is input to the circuit simulator to conduct simulation for calculating current distribution of the circuit C21. Then, training data is generated from the current distribution of the circuit C21 calculated by the simulation. On the other hand, since no crosstalk occurs between two lines L221 and L222 in the circuit C22, there is room for data extension. In this case, the circuit C22 may be regarded as a combination of the line of the circuit C12 and the line of the circuit C13. Accordingly, training data is generated from current distribution of the circuit C22 obtained by data extension that adds the calculated current distribution of the circuit C12 and the calculated current distribution of the circuit C13.

Since the circuit C31 has lines L311 and L312 not coupled to each other through crosstalk, there is room for data extension. In this case, the circuit C31 may be regarded as a combination of the lines of the circuit C21 and a line of a circuit C14 (not illustrated). Accordingly, training data is generated from current distribution of the circuit C31 obtained by data extension that adds the calculated current distribution of the circuit C21 and the calculated current distribution of the circuit C14. On the other hand, since three lines are coupled to each other through crosstalk in the circuit C32, there is no room for data extension. In this case, the circuit information of the circuit C32 is input to the circuit simulator to conduct simulation for calculating current distribution of the circuit C32. Then, training data is generated from the current distribution of the circuit C32 calculated by the simulation.

Figure 9:
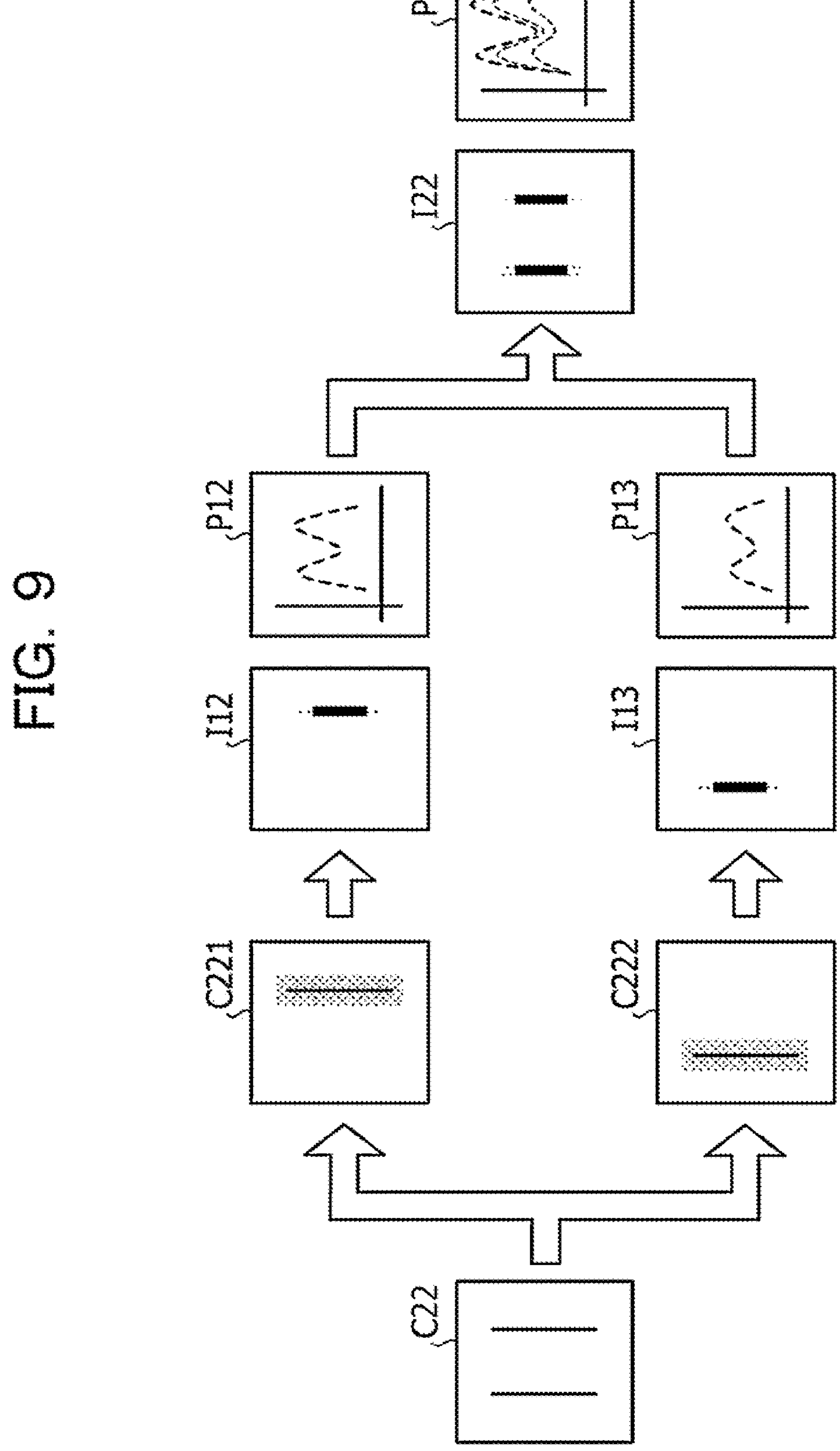
FIG. 9 is a diagram illustrating exemplary data extension.

Here, exemplary data extension exemplified in FIG. 8 is illustrated in FIG. 9. FIG. 9 is a diagram illustrating exemplary data extension. FIG. 9 exemplifies, as merely an example, data extension of generating training data from the circuit C22 illustrated in FIG. 8. As illustrated in FIG. 9, the circuit C22 is divided into a circuit C221 and a circuit C222 with a part with no crosstalk as a boundary.

Subsequently, a circuit having a geometry similar to the geometry of the circuit C221 is searched for from the circuits for which current distribution has already been calculated by simulation. Since such a search hits the circuit C12, current distribution I12 and EMI intensity P12 of the circuit C12, which have already been calculated, are obtained.

Before, after, or in parallel with this, a circuit having a geometry similar to the geometry of the circuit C222 is searched for from the circuits for which current distribution has already been calculated by simulation. Since such a search hits the circuit C13, current distribution 113 and EMI intensity P13 of the circuit C13, which have already been calculated, are obtained.

Then, the current distribution 112 of the circuit C12 and the current distribution 113 of the circuit C13 are synthesized to generate current distribution 122 of the circuit C22. Moreover, the EMI intensity P12 of the circuit C12 and the EMI intensity P13 of the circuit C13 are synthesized to generate EMI intensity P22 of the circuit C22. The current distribution 122 and the EMI intensity P22 of the circuit C22 obtained by such data extension are associated with each other to generate training data for the circuit C22.

As described above, the training data generation function according to the present embodiment generates training data by switching whether to generate current distributions of two lines by simulation or to synthesize current distributions of the respective lines depending on a ratio between a distance between the two lines and a distance between the two lines and a GND layer. For example, in the example illustrated in FIG. 8, training data for two of the seven circuits, circuits C22 and C31, may be generated through data extension. Thus, it becomes possible to reduce the modeling cost of the circuits C22 and C31 input to the circuit simulator and the cost of calculating, using the circuit simulator, the current distribution and EMI intensity of the circuits C22 and C31. Therefore, according to the training data generation function according to the present embodiment, it becomes possible to reduce the amount of calculation at the time of training data generation. For example, it becomes possible to reduce the number of times of simulation execution at the time of training data generation for a multiple-line circuit.

Next, a functional configuration of the server device 10 according to the present embodiment will be described. FIG. 1 schematically illustrates blocks corresponding to functions of the server device 10. As illustrated in FIG. 1, the server device 10 includes a communication interface unit 11, a storage unit 13, and a control unit 15. Note that FIG. 1 merely illustrates an excerpt of functional units related to the data generation function described above, and the server device 10 may include a functional unit other than the illustrated ones, such as a functional unit that an existing computer is equipped with by default or as an option.

The communication interface unit 11 corresponds to an exemplary communication control unit that controls communication with another device, such as the client terminal 30. As merely an example, the communication interface unit 11 may be implemented by a network interface card such as a LAN card. For example, the communication interface unit 11 receives, from the client terminal 30, a request for generating training data and various user settings related to the training data generation function. Furthermore, the communication interface unit 11 outputs, to the client terminal 30, a set of training data generated by the training data generation function, a trained EMI prediction model, and the like.

The storage unit 13 is a functional unit that stores various types of data. As merely an example, the storage unit 13 is implemented by storage, such as internal, external, or auxiliary storage. For example, the storage unit 13 stores a circuit information group 13A, a training data set 13B, and model data 13M. In addition to those circuit information group 13A, training data set 13B, and model data 13M, the storage unit 13 may store various types of data such as account information of a user who receives provision of the training data generation function described above. Note that the training data set 13B and the model data 13M will be described later together with descriptions of a generation unit 18 or a training unit 19.

The circuit information group 13A is a set of n pieces of circuit information. For example, in a case of generating an EMI prediction model for a circuit having a maximum of k lines, n training data candidate circuits are enumerated in a procedure such as variations of a shape of one line, variations of a shape of two lines, variations of a shape of k lines, and the like. The n pieces of circuit information corresponding to the respective n training data candidate circuits enumerated in this manner are stored in the storage unit 13. For example, the circuit information may include circuit geometry information, circuit connection information, and the like. Among those, the geometry information may include geometries such as shapes and arrangement of lines, GND layers, and the like. The geometry may include coordinates of a start point, end point, inflection point, relay point, branch point, and the like forming the line, as well as coordinates of a vertex, gravity center point, center point, and the like forming the surface of the GND layer. Such coordinates may be, as an example, two-dimensional coordinates corresponding to the substrate surface, and may also be three-dimensional coordinates including an axis in the layer direction, such as the vertical direction. Furthermore, examples of the connection information include a netlist to be used in a circuit simulator, such as a Simulation Program with Integrated Circuit Emphasis (SPICE). For example, the connection information may be obtained by being imported from a design support program of a Computer-Aided Design (CAD) system or the like.

The control unit 15 is a processing unit that takes overall control of the server device 10. For example, the control unit 15 is implemented by a hardware processor. As illustrated in FIG. 1, the control unit 15 includes an acquisition unit 16, a determination unit 17, a generation unit 18, and a training unit 19.

The acquisition unit 16 is a processing unit that obtains circuit information. As merely an example, the acquisition unit 16 may start processing when a request for generating training data is received from the client terminal 30. At the start of such processing, as an example, the acquisition unit 16 may initialize various parameters related to the training data generation function. For example, it sets a crosstalk determination criterion, such as a threshold d, which is to be compared with a ratio between the distance s between two lines and the distance h from the lines to the GND layer. For the threshold d, a user setting received via the client terminal 30 may be applied, or a system setting determined by a designer of the training data generation function described above or the like may be applied. Thereafter, the acquisition unit 16 refers to the circuit information group 13A stored in the storage unit 13, thereby obtaining the circuit information of the n training data candidate circuits.

The determination unit 17 is a processing unit that determines whether or not a relationship between a distance between two lines included in circuit information and a distance between the two lines and a GND layer satisfies a condition. As merely an example, the determination unit 17 pairs, for each training data candidate circuit obtained by the acquisition unit 16, two lines independent from each other among the lines included in the training data candidate circuit. For example, when m lines are included in the training data candidate circuit, nC2 pairs corresponding to combinations obtained by extracting two lines from the m lines are obtained. Then, the determination unit 17 calculates, for each of the nC2 pairs, a shortest distance s between the two lines corresponding to the pair. Then, the determination unit 17 determines whether or not the shortest distance s between the two lines is equal to or longer than the threshold d, which is an exemplary crosstalk determination criterion.

Here, as merely an example, the threshold d as the crosstalk determination criterion may be set to 5*h. As a rule of thumb, when the shortest distance s between two lines is at least five times the distance h from the two lines to the GND layer, the effect of the crosstalk (capacitive coupling and inductive coupling) becomes negligibly small. Thus, the threshold d as the crosstalk determination criterion may be determined as 5*h. In this case, while it is determined that no crosstalk occurs when the shortest distance s is equal to or longer than 5*h, it is determined that crosstalk occurs when the shortest distance s is not equal to or longer than 5*h. Note that the threshold d as the crosstalk determination criterion may accept any value according to a user setting regardless of a system setting.

Figure 10:
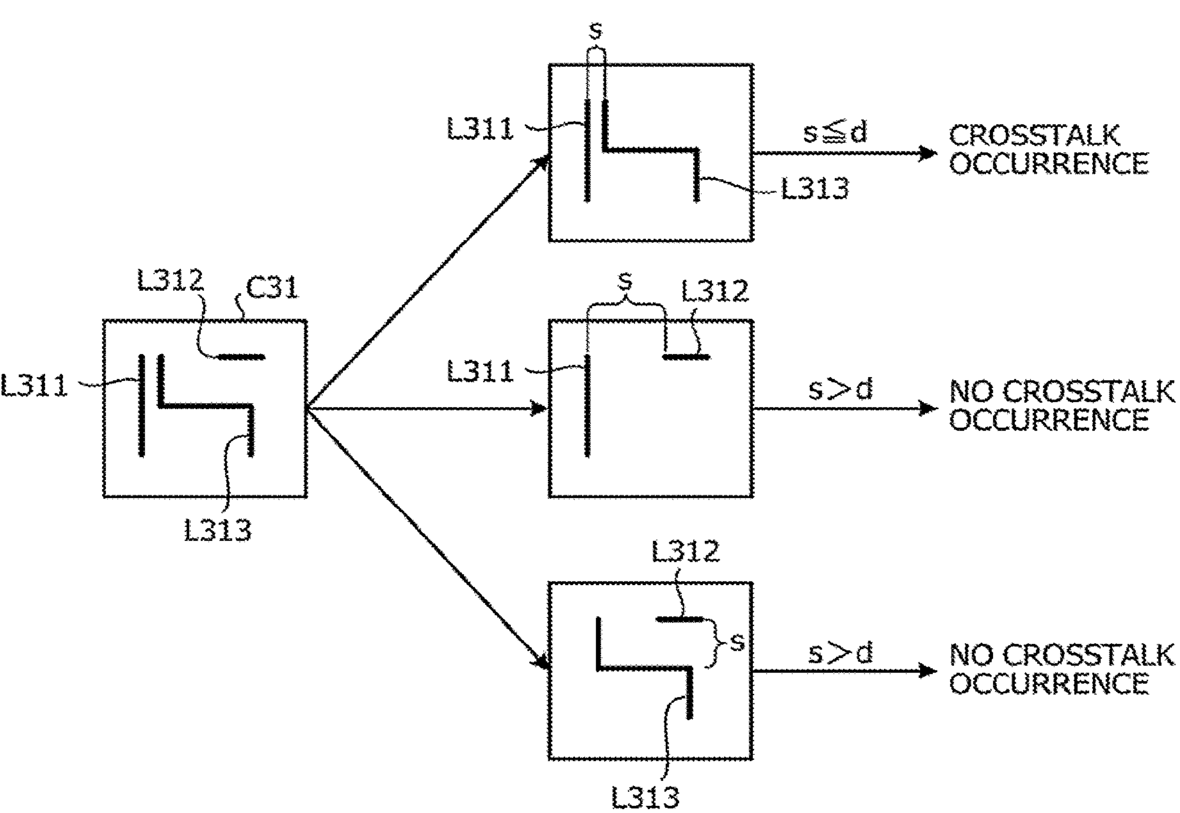
FIG. 10 is a diagram illustrating exemplary crosstalk determination.

FIG. 10 is a diagram illustrating exemplary crosstalk determination. FIG. 10 illustrates, as an example, an exemplary case of determining crosstalk of the circuit C31. As illustrated in FIG. 10, the circuit C31 includes three lines L311, L312, and L313. In this case, presence or absence of crosstalk is determined for each of 3C2 pairs corresponding to combinations obtained by extracting two lines from the three lines L311, L312, and L313. Here, for convenience of explanation, FIG. 10 illustrates an excerpt of the pair of the lines L311 and L313 as a circuit C311, an excerpt of the pair of the lines L311 and L312 as a circuit C312, and an excerpt of the pair of the lines L312 and L313 as a circuit C313. As illustrated in the circuit C311, the pair of the lines L311 and L313 is determined to have crosstalk. On the other hand, as illustrated in the circuits C312 and C313, the pair of the lines L311 and L312 is determined to have no crosstalk, and the pair of the lines L312 and L313 is also determined to have no crosstalk.

Thereafter, the determination unit 17 determines whether or not there are lines that are mutually unreachable through crosstalk in the training data candidate circuit being selected. Then, when there are lines that are mutually unreachable through crosstalk, it is determined that there is room for applying data extension to the training data candidate circuit. In this case, the training data candidate circuit being selected is added to a data extension candidate list out of the data extension candidate list and a simulation candidate list stored in a storage area such as a memory, storage, or the like (not illustrated). On the other hand, when there are no lines that are mutually unreachable through crosstalk, it is determined that there is no room for applying data extension to the training data candidate circuit. In this case, the training data candidate circuit being selected is added to the simulation candidate list.

For example, in the example of the circuit C31 illustrated in FIG. 10, the lines L311 and L313 are coupled to each other through crosstalk. However, no crosstalk occurs in the pair of the lines L311 and L312 and the pair of the lines L312 and L313. Thus, the line L312 may not be reached through either the line L311 or the line L313. Accordingly, the lines L311 and L313 and the line L312 are specified as unreachable.

In addition to such crosstalk determination, the determination unit 17 further determines, for each of partial lines that are mutually unreachable through crosstalk, whether or not a circuit having a geometry matching the geometry of the partial line is included in the simulation candidate list.

Figure 11:
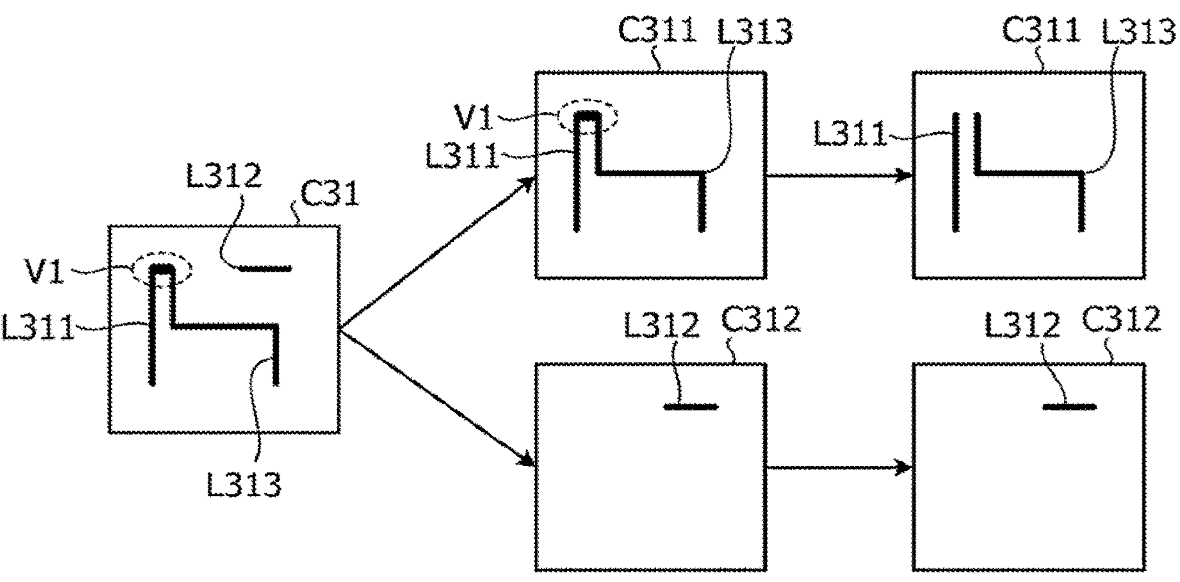
FIG. 11 is a diagram illustrating an exemplary method of making a division into partial lines.

To specifically describe this, first, the determination unit 17 divides, for each training data candidate circuit included in the data extension candidate list, the training data candidate circuit into partial lines. FIG. 11 is a diagram illustrating an exemplary method of making a division into partial lines. FIG. 11 illustrates an example of dividing the circuit C31 illustrated in FIG. 10 into partial lines. For example, as illustrated in the crosstalk determination results illustrated in FIG. 10, it is assumed that the lines L311 and L313 are determined as a pair having crosstalk and other pairs are determined to have no crosstalk. In this case, a virtual line V1 is set for the pair of the lines L311 and L313 determined to have crosstalk. For example, the virtual line V1 is set at a position coupling the shortest distance s between the lines L311 and L313. After such a virtual line V1 is set, the circuit C31 is divided with a point with no connection, for example, the pair determined to have no crosstalk, as a boundary. As a result, it is divided into the partial line C311 including the lines L311 and L313 and the partial line C312 including the line L312. Then, the virtual line V1 set before the division is removed.

In this manner, the division into partial lines is achieved by searching for lines that are mutually unreachable through crosstalk. As an example, it is assumed that, in a circuit including three lines of lines A, B, and C, crosstalk occurs between the lines A and B, no crosstalk occurs between the lines A and C, and no crosstalk occurs also between the lines B and C. In this case, a connection relationship including electromagnetic connection is (A-B, C). Accordingly, the circuit is divided into a partial line AB and a partial line C. As another example, in the circuit including the three lines of lines A, B, and C, it is assumed that crosstalk occurs between the lines A and B, crosstalk also occurs between the lines B and C, and no crosstalk occurs between the lines A and C. In this case, the connection relationship including the electromagnetic connection is (A-B-C), and thus the circuit may not be divided into partial lines.

Thereafter, the determination unit 17 searches the simulation candidate list for, for each partial line, a circuit having a geometry matching the geometry of the partial line. Such geometry matching may be implemented by matching coordinates of feature points, such as a start point, end point, inflection point, relay point, branch point, and the like, forming lines between the partial line and the lines of the training data candidate circuit stored in the simulation candidate list. Note that, although the geometry matching has been exemplified here, complete matching is not necessarily the condition, and the matching may be carried out with a condition that a similarity level is equal to or higher than a threshold or that a distance or dissimilarity level is within a threshold.

Here, when there is even one partial line not hit by the search for a circuit having a geometry matching the geometry of the partial line, it is determined that there is a shortage of circuits to be used by the training data candidate circuit, which is a division source, for synthesis at the time of data extension. In this case, the determination unit 17 shifts the training data candidate circuit as the division source from the data extension candidate list to the simulation candidate list. That is, it removes the entry of the training data candidate circuit from the data extension candidate list, and adds the entry to the simulation candidate list. On the other hand, if there is no partial line not hit by the search for a circuit having a geometry matching the geometry of the partial line, it is determined that there is no shortage of circuits to be used by the training data candidate circuit as the division source for synthesis at the time of data extension. In this case, a shift from the data extension candidate list to the simulation candidate list is not performed.

The generation unit 18 is a processing unit that generates training data corresponding to a training data candidate circuit. As illustrated in FIG. 1, the generation unit 18 includes a simulation unit 18A and a data extension unit 18B.

The simulation unit 18A is a processing unit that generates training data by simulation. As merely an example, the simulation unit 18A performs the following process for each training data candidate circuit stored in the simulation candidate list. That is, the simulation unit 18A inputs the circuit information of the training data candidate circuit to the circuit simulator, thereby executing simulation for calculating current distribution and EMI intensity of the circuit. Although an exemplary case where the circuit simulator is executed in the server device 10 has been described here as merely an example, the circuit simulator may be executed by any execution entity. For example, it is also possible to use an external device, service, or an application programming interface (API) published by software that executes the circuit simulator to request calculation of current distribution and EMI intensity. Thereafter, the simulation unit 18A generates training data in which the current distribution and the EMI intensity obtained by the simulation are associated with each other.

More specifically, the circuit simulator calculates current distribution for each frequency component included in a specific frequency domain based on input circuit information. As a result, a current distribution image in which the current distribution of the circuit calculated by the circuit simulator, for example, the intensity of current flowing through the substrate surface, is mapped above a two-dimensional map is obtained for each frequency component. Subsequently, the simulation unit 18A identifies one or a plurality of resonance frequencies at which the maximum value of the current distribution calculated for each frequency component is maximized.

Thereafter, the simulation unit 18A performs a process for processing pixel values of pixels included in the current distribution image corresponding to the resonance frequency described above based on a distance of each pixel from the line from the aspect of approximating the near field of the electronic circuit. For example, a current distribution image generated such that a grayscale value approaches the upper limit, such as 255 corresponding to white, as the current flowing through the line increases while the grayscale value approaches the lower limit, such as 0 corresponding to black as the current decreases will be exemplified. In this case, as the distance from the line of the pixel included in the current distribution image decreases, a shift amount for shifting the grayscale value of the pixel to the upper limit side is set larger. On the other hand, as the distance from the line of the pixel included in the current distribution image increases, the shift amount for shifting the grayscale value of the pixel to the lower limit side is set smaller. With the grayscale values of the pixels of the current distribution image being shifted according to such a shift amount, it becomes possible to obtain a current distribution image in which the current intensity is emphasized according to the distance from the line.

Then, the simulation unit 18A generates training data in which the resonance frequency, the current distribution image, and the EMI intensity are associated with each other. Here, the resonance frequency, which is a scalar value, is converted into a matrix that may be input to a normal neural network as an exemplary EMI prediction model. For example, in a case of inputting multiple pieces of input data of the current distribution image and the resonance frequency to the EMI prediction model, from the aspect of unifying the matrix of each channel into the same type, a matrix corresponding to the two-dimensional array of the current distribution image is generated, and the resonance frequency value is embedded in each element of the matrix. Training data is generated in which the matrix and the current distribution image (matrix) in which the resonance frequency is embedded generated in this manner are associated with the EMI intensity, which is the ground truth label.

The data extension unit 18B is a processing unit that generates training data by data extension. As merely an example, the data extension unit 18B performs the following process for each training data candidate circuit stored in the data extension list in the order of being registered in the data extension list. That is, the data extension unit 18B divides the training data candidate circuit into partial lines. Then, for each partial line obtained by the division, the data extension unit 18B searches the circuits for which training data has been generated by the simulation unit 18A for a circuit having a geometry similar to the geometry of the partial line. Thereafter, the data extension unit 18B obtains, for each partial line, a calculation result of current distribution and EMI intensity as a simulation result corresponding to the circuit hit by the search. Then, the data extension unit 18B synthesizes the current distribution obtained for each partial line between the individual partial lines, thereby generating current distribution of the training data candidate circuit. Moreover, the data extension unit 18B synthesizes the EMI intensity obtained for each partial line between the individual partial lines, thereby generating EMI intensity of the training data candidate circuit. Then, the data extension unit 18B associates the synthesized current distribution with the synthesized EMI intensity, thereby generating training data for the training data candidate circuit.

Thereafter, when training data is generated for each of all pieces of circuit information included in the circuit information group 13A, the generation unit 18 registers, in the storage unit 13, a set of the training data generated for each circuit information as the training data set 13B.

The training unit 19 is a processing unit that trains an EMI prediction model using training data for machine learning. As merely an example, when training data is generated for each of all pieces of circuit information included in the circuit information group 13A, or when the training data set 13B is stored in the storage unit 13, the training unit 19 performs the following process. That is, the training unit 19 trains an EMI prediction model using the current distribution of the training data included in the training data set 13B as a feature and the EMI intensity as an objective variable. For example, the training unit 19 inputs, to the EMI prediction model, the resonance frequency corresponding to the input data of the first channel and the current distribution image corresponding to the input data of the second channel. As a result, an estimated value of the EMI intensity is obtained as an output of the EMI prediction model. Then, the training unit 19 updates the parameters of the EMI prediction model based on the loss between the estimated value of the EMI intensity output by the EMI prediction model and the EMI intensity of the ground truth label. As a result, a trained EMI prediction model is obtained.

Data related to the trained EMI prediction model obtained in this manner is stored in the storage unit 13 as the model data 13M. For example, in a case where the machine learning model is a neural network, the model data 13M may include parameters of the machine learning model such as a weight and a bias of each layer, including a layer structure of the machine learning model such as neurons and synapses of each layer including an input layer, a hidden layer, and an output layer.

In addition, a model providing service may be provided by the model data of the trained EMI prediction model being provided to the client terminal 30, or an EMI prediction service for predicting circuit EMI intensity may be provided using the trained EMI prediction model.

Figure 13:
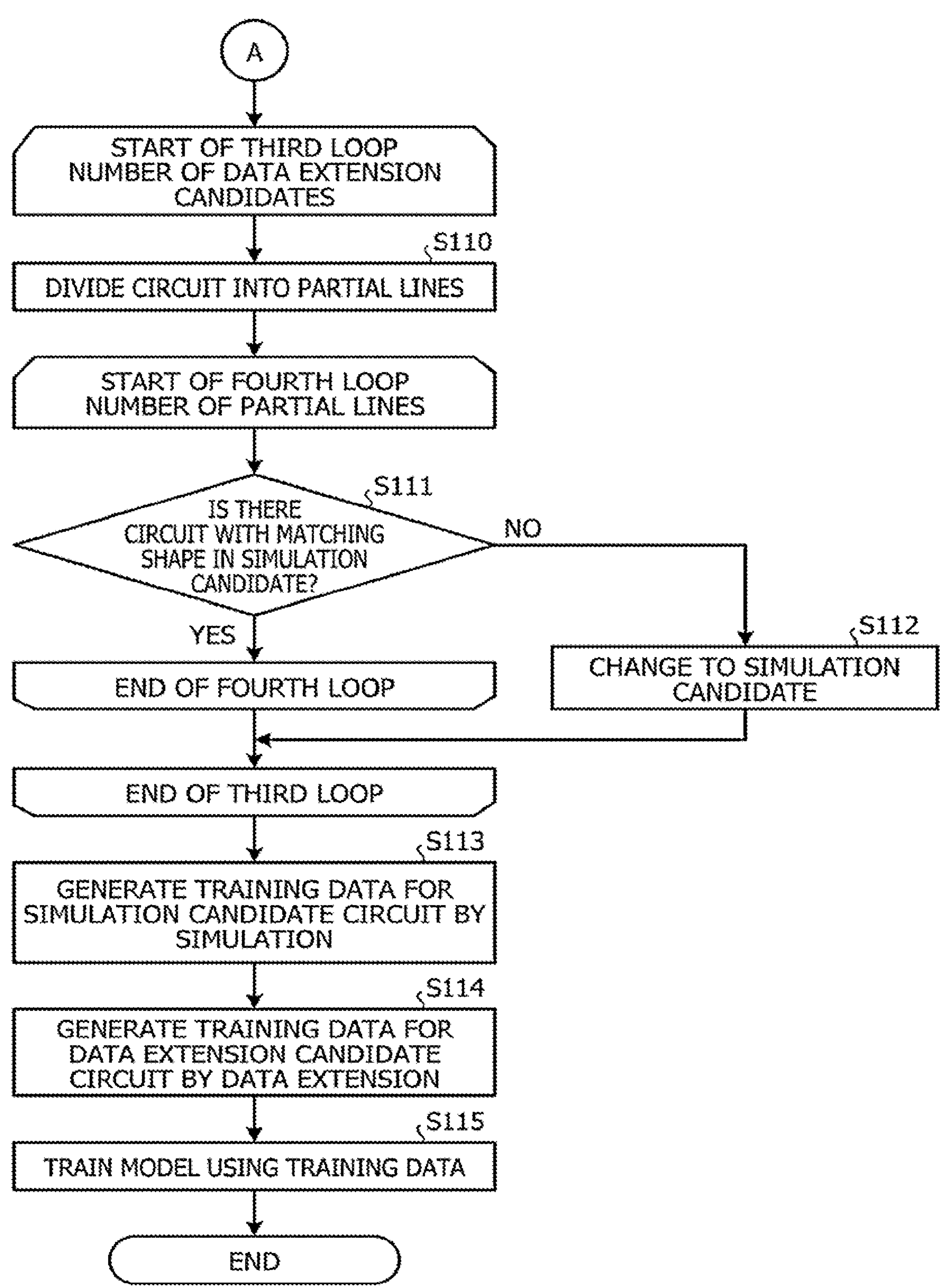
FIG. 13 is a flowchart (2) illustrating a procedure of the training data generation process according to the first embodiment.

Next, a processing flow of the server device 10 according to the present embodiment will be described. FIGS. 12 and 13 are flowcharts illustrating a procedure of a training data generation process according to the first embodiment. As merely one aspect, this process may start when a request for generating training data is received from the client terminal 30.

As illustrated in FIG. 12, the acquisition unit 16 refers to the circuit information group 13A stored in the storage unit 13 to obtain circuit information of n training data candidate circuits (step S101).

Then, the determination unit 17 starts a first loop process that repeats a process of steps S102 to S109 the number of times corresponding to the number of n training data candidate circuits obtained in step S101. Note that, although an example of performing the loop process is described here, processing of steps S102 to S106 may be performed in parallel.

That is, the determination unit 17 pairs two lines independent from each other among the lines included in the training data candidate circuit being subject to the loop process (step S102). For example, when m lines are included in the training data candidate circuit, nC2 pairs corresponding to combinations obtained by extracting two lines from the m lines are obtained.

Then, the determination unit 17 stars a second loop process that repeats a process of steps S103 to S106 the number of times corresponding to the nC2 pairs obtained in the paring in step S102. Note that, although an example of performing the loop process is described here, processing of steps S103 to S106 may be performed in parallel.

That is, the determination unit 17 calculates the shortest distance s between the two lines corresponding to the pair being subject to the loop process (step S103). Then, the determination unit 17 determines whether or not the shortest distance s between the two lines is equal to or longer than a crosstalk determination criterion d (step S104).

Here, if the shortest distance s is equal to or longer than the crosstalk determination criterion d (Yes in step S104), it is determined that no crosstalk occurs (step S105). On the other hand, if the shortest distance s is not equal to or longer than the crosstalk determination criterion d (No in step S104), it is determined that crosstalk occurs (step S106).

When the second loop process is terminated by repetitions of steps S103 to S106, a crosstalk determination result is obtained for each pair obtained by paring two lines included in the training data candidate circuit.

Thereafter, the determination unit 17 determines whether or not there are lines that are mutually unreachable through crosstalk in the training data candidate circuit being subject to the loop process (step S107). Then, when there are lines that are mutually unreachable through crosstalk (Yes in step S107), it is determined that there is room for applying data extension to the training data candidate circuit. In this case, the training data candidate circuit being subject to the loop process is added to the data extension candidate list (step S108).

On the other hand, when there are no lines that are mutually unreachable through crosstalk (No in step S107), it is determined that there is no room for applying data extension to the training data candidate circuit. In this case, the training data candidate circuit being subject to the loop process is added to the simulation candidate list (step S109).

When the first loop process is terminated by repetitions of steps S102 to S109, the n training data candidate circuits are classified as either the data extension candidate or the simulation candidate.

Then, the determination unit 17 starts a third loop process that repeats a process of steps S110 to S112 illustrated in FIG. 13 the number of times corresponding to the number of training data candidate circuits included in the data extension candidate list. Note that, although an example of performing the loop process is described here, processing of steps S110 to S112 may be performed in parallel.

For example, as illustrated in FIG. 13, the determination unit 17 divides the training data candidate circuit being subject to the loop process into partial lines (step S110). Thereafter, a fourth loop process, which repeats a process of steps S111 and S112 the number of times corresponding to the number of partial lines obtained by the division in step S110, starts. Note that, although an example of performing the loop process is described here, processing of steps S111 and S112 may be performed in parallel.

That is, the determination unit 17 searches the simulation candidate list for a circuit having a geometry matching the geometry being subject to the loop process. At this time, if there is even one partial line not hit by the search for a circuit having a geometry matching the geometry of the partial line (No in step S111), it is determined that there is a shortage of circuits to be used by the training data candidate circuit, which is a division source, for synthesis at the time of data extension. In this case, the determination unit 17 shifts the training data candidate circuit as the division source from the data extension candidate list to the simulation candidate list (step S112).

On the other hand, if there is no partial line not hit by the search for a circuit having a geometry matching the geometry of the partial line (No in step S111), it is determined that there is no shortage of circuits to be used by the training data candidate circuit as the division source for synthesis at the time of data extension. In this case, a shift from the data extension candidate list to the simulation candidate list is not performed.

When the fourth loop process in step S111 is terminated, it is determined whether or not to shift the training data candidate circuit as the division source from the data extension candidate list to the simulation candidate list. Then, when the third loop process of steps S110 to S112 is terminated, checking for the shift for all the training data candidate circuits included in the data extension candidate list is complete.

Thereafter, the simulation unit 18A generates, by simulation, training data for the training data candidate circuits stored in the simulation candidate list (step S113). Subsequently, the data extension unit 18B generates, by data extension, training data for the training data candidate circuits stored in the data extension candidate list (step S114).

Finally, the training unit 19 trains the EMI prediction model using the current distribution of the training data generated in step S113 or S114 as a feature and the EMI intensity as an objective variable (step S115), and the process is terminated.

As described above, the training data generation function according to the present embodiment generates training data by switching whether to generate current distributions of two lines by simulation or to synthesize current distributions of the respective lines depending on a ratio between a distance between the two lines and a distance between the two lines and a GND layer. For example, when the circuit including the three lines of lines A, B, and C is used as an example, patterns that may generate training data by simulation are as follows. That is, only the line A, only the line B, only the line C, the lines A and B (coupled), the lines A and C (coupled), the lines B and C (coupled), and the lines A, B, and C (coupled). Of those, patterns to which data extension may be applied are the lines A and B (uncoupled), the lines A and C (uncoupled), the lines B and C (uncoupled), the lines A, B, and C (only A and B are coupled), the lines A, B, and C (only A and C are coupled), and the lines A, B, and C (only B and C are coupled) at the maximum. Therefore, according to the training data generation function according to the present embodiment, it becomes possible to reduce the amount of calculation at the time of training data generation. For example, it becomes possible to reduce the number of times of simulation execution at the time of training data generation for a multiple-line circuit.

Second Embodiment

Incidentally, while the embodiment related to the disclosed device has been described above, the present disclosure may be carried out in a variety of different modes in addition to the embodiment described above. Thus, hereinafter, another embodiment included in the present disclosure will be described.

For example, each of the illustrated components of individual devices is not necessarily physically configured as illustrated in the drawings. In other words, specific modes of distribution and integration of the individual devices are not limited to those illustrated, and all or a part of the devices may be configured by being functionally or physically distributed or integrated in any unit depending on various loads, use situations, and the like. For example, the acquisition unit 16, the determination unit 17, the generation unit 18, or the training unit 19 may be coupled as an external device of the server device 10 via a network. Furthermore, each of the acquisition unit 16, the determination unit 17, the generation unit 18, and the training unit 19 may be included in another device, and may be coupled via the network to cooperate with each other, whereby the functions of the server device 10 described above may be implemented.

Furthermore, various kinds of processing described in the embodiment above may be achieved by a computer such as a personal computer or a workstation executing a program prepared in advance. Thus, hereinafter, an exemplary computer that executes a training data generation program having functions similar to those in the first and second embodiments will be described with reference to FIG. 14.

Figure 14:
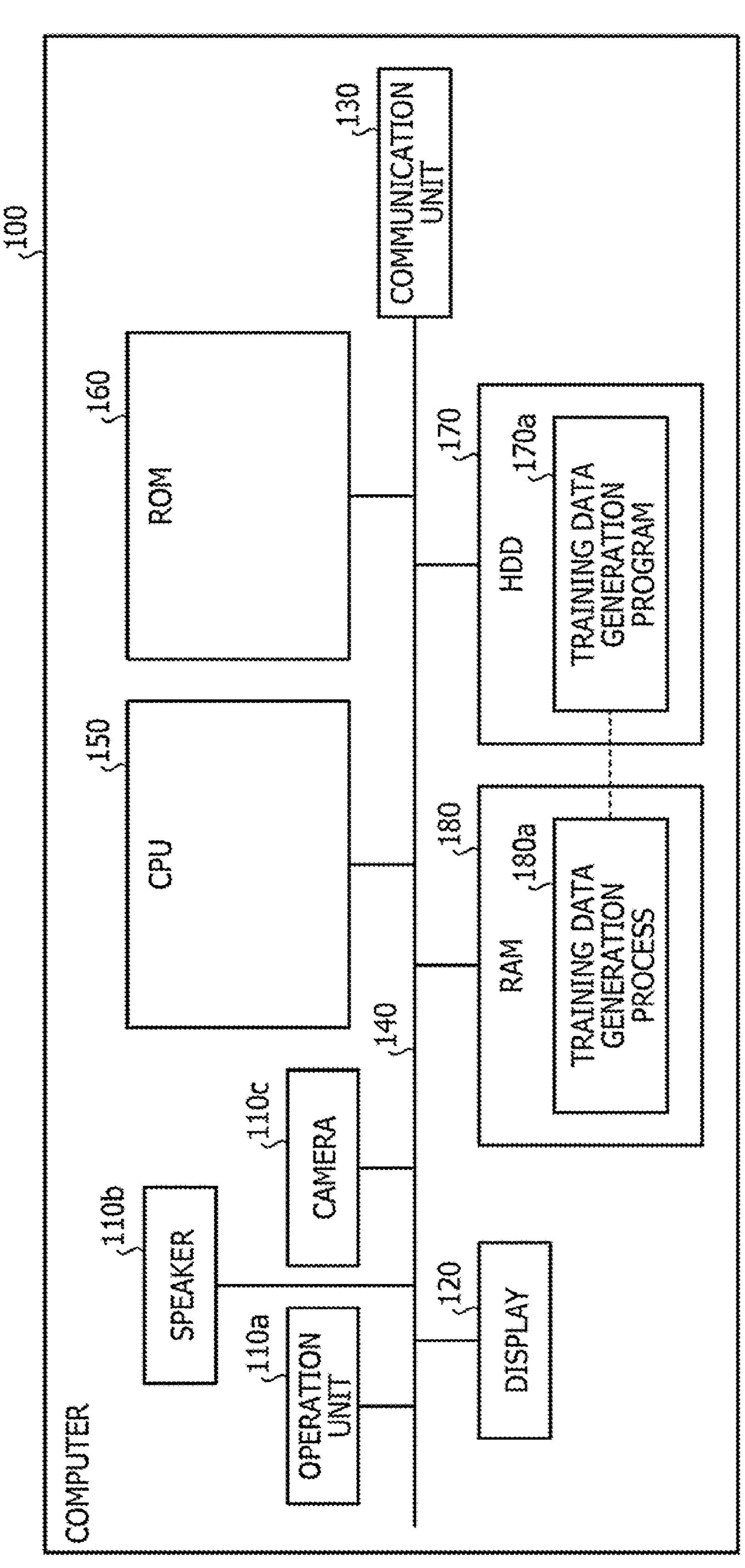
FIG. 14 is a diagram illustrating an exemplary hardware configuration of a computer.

FIG. 14 is a diagram illustrating an exemplary hardware configuration of a computer. As illustrated in FIG. 14, a computer 100 includes an operation unit 110*a*, a speaker 110*b*, a camera 110*c*, a display 120, and a communication unit 130. Moreover, the computer 100 includes a central processing unit (CPU) 150, a read-only memory (ROM) 160, a hard disk drive (HDD) 170, and a random access memory (RAM) 180. Those individual units 110 to 180 are coupled to each other via a bus 140.

Here, although the CPU is exemplified as an exemplary hardware processor in FIG. 14, it is not limited to this. That is, it is not limited to a general-purpose processor such as a CPU, a micro processing unit (MPU), or the like, but may be a deep learning unit (DLU), general-purpose computing on graphics processing units (GPGPU), a GPU cluster, or the like.

As illustrated in FIG. 14, the HDD 170 stores a training data generation program 170*a* that implements functions similar to the acquisition unit 16, the determination unit 17, the generation unit 18, and the training unit 19 described in the first embodiment described above. This training data generation program 170*a* may be integrated or separated in a similar manner to the individual components of the acquisition unit 16, the determination unit 17, the generation unit 18, and the training unit 19 illustrated in FIG. 1. In other words, the HDD 170 does not necessarily store all the pieces of data illustrated in FIG. 1, and it is sufficient if the HDD 170 stores data to be used for processing.

Under such an environment, the CPU 150 reads the training data generation program 170*a* from the HDD 170, and loads it into the RAM 180. As a result, as illustrated in FIG. 14, the training data generation program 170*a* functions as a training data generation process 180*a*. This training data generation process 180*a* loads various types of data read from the HDD 170 into an area assigned to the training data generation process 180*a* in the storage area included in the RAM 180, and executes various types of processing using those various types of loaded data. For example, examples of the processing to be executed by the training data generation process 180*a* include the processing illustrated in FIGS. 12 and 13. Note that all the processing units indicated in the first embodiment described above do not necessarily work in the CPU 150, and it is sufficient if a processing unit corresponding to processing to be executed is virtually implemented.

Note that the training data generation program 170*a* described above is not necessarily stored in the HDD 170 or the ROM 160 from the beginning. For example, each program is stored in a "portable physical medium" such as a flexible disk, which is what is called an FD, a compact disc read only memory (CD-ROM), a digital versatile disc (DVD), a magneto-optical disk, an integrated circuit (IC) card, or the like to be inserted into the computer 100. Then, the computer 100 may obtain each program from those portable physical media to execute it. Furthermore, each program may be stored in another computer, server device, or the like coupled to the computer 100 via a public line, the Internet, a LAN, a wide area network (WAN), or the like, and the computer 100 may obtain each program from them to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a training data generation program for causing a computer to perform processing comprising:

obtaining circuit information;

determining whether or not a relationship between a distance between two lines included in the circuit information and a distance between the two lines and a GND layer satisfies a condition;

when the relationship satisfies the condition, generating first current distribution information associated with the two lines by simulation and generating training data for machine learning based on the first current distribution information; and when the relationship does not satisfy the condition, generating second current distribution information associated with the two lines by synthesizing pieces of current distribution information associated with the respective two lines and generating the training data for machine learning based on the second current distribution information.

2. The non-transitory computer-readable recording medium according to claim 1, wherein the determining includes determining whether or not a ratio between the distance between the two lines and the distance between the two lines and the GND layer is equal to or higher than a threshold, and the generating includes generating the first current distribution information associated with the two lines by the simulation when the ratio is not equal to or higher than the threshold, and generating the second current distribution information associated with the two lines by synthesizing the pieces of the current distribution information associated with the respective two lines when the ratio is equal to or higher than the threshold.

3. The non-transitory computer-readable recording medium according to claim 1, wherein the generating includes, when the relationship does not satisfy the condition, generating the second current distribution information by synthesizing the current distribution information of a first line generated by the simulation when the training data for the first line of the two lines is generated and the current distribution information of a second line generated by the simulation when the training data for the second line of the two lines different from the first line is generated.

4. The non-transitory computer-readable recording medium according to claim 1, wherein the generating includes generating the training data in which spatial distribution of current that flows through a circuit associated with the first current distribution information or the second current distribution information is associated with an electromagnetic wave emission state of the circuit.

5. The non-transitory computer-readable recording medium according to claim 4, the processing further comprising:

training a machine learning model with the spatial distribution of the current as a feature and the electromagnetic wave emission state as an objective variable using a set of the training data.

6. A training data generation method implemented by a computer, the method comprising:

obtaining circuit information;

determining whether or not a relationship between a distance between two lines included in the circuit information and a distance between the two lines and a GND layer satisfies a condition;

when the relationship satisfies the condition, generating first current distribution information associated with the two lines by simulation and generating training data for machine learning based on the first current distribution information; and when the relationship does not satisfy the condition, generating second current distribution information associated with the two lines by synthesizing pieces of current distribution information associated with the respective two lines and generating the training data for machine learning based on the second current distribution information.

7. The training data generation method according to claim 6, wherein the determining includes determining whether or not a ratio between the distance between the two lines and the distance between the two lines and the GND layer is equal to or higher than a threshold, and the generating includes generating the first current distribution information associated with the two lines by the simulation when the ratio is not equal to or higher than the threshold, and generating the second current distribution information associated with the two lines by synthesizing the pieces of the current distribution information associated with the respective two lines when the ratio is equal to or higher than the threshold.

8. The training data generation method according to claim 6, wherein the generating includes, when the relationship does not satisfy the condition, generating the second current distribution information by synthesizing the current distribution information of a first line generated by the simulation when the training data for the first line of the two lines is generated and the current distribution information of a second line generated by the simulation when the training data for the second line of the two lines different from the first line is generated.

9. The training data generation method according to claim 6, wherein the generating includes generating the training data in which spatial distribution of current that flows through a circuit associated with the first current distribution information or the second current distribution information is associated with an electromagnetic wave emission state of the circuit.

10. The training data generation method according to claim 9, the method further comprising:

training a machine learning model with the spatial distribution of the current as a feature and the electromagnetic wave emission state as an objective variable using a set of the training data.

11. A training data generation apparatus comprising:

a memory; and a processor coupled to the memory, the processor being configured to perform processing including:

obtaining circuit information;

determining whether or not a relationship between a distance between two lines included in the circuit information and a distance between the two lines and a GND layer satisfies a condition;

when the relationship satisfies the condition, generating first current distribution information associated with the two lines by simulation and generating training data for machine learning based on the first current distribution information; and when the relationship does not satisfy the condition, generating second current distribution information associated with the two lines by synthesizing pieces of current distribution information associated with the respective two lines and generating the training data for machine learning based on the second current distribution information.

12. The training data generation apparatus according to claim 11, wherein the determining includes determining whether or not a ratio between the distance between the two lines and the distance between the two lines and the GND layer is equal to or higher than a threshold, and the generating includes generating the first current distribution information associated with the two lines by the simulation when the ratio is not equal to or higher than the threshold, and generating the second current distribution information associated with the two lines by synthesizing the pieces of the current distribution information associated with the respective two lines when the ratio is equal to or higher than the threshold.

13. The training data generation apparatus according to claim 11, wherein the generating includes, when the relationship does not satisfy the condition, generating the second current distribution information by synthesizing the current distribution information of a first line generated by the simulation when the training data for the first line of the two lines is generated and the current distribution information of a second line generated by the simulation when the training data for the second line of the two lines different from the first line is generated.

14. The training data generation apparatus according to claim 11, wherein the generating includes generating the training data in which spatial distribution of current that flows through a circuit associated with the first current distribution information or the second current distribution information is associated with an electromagnetic wave emission state of the circuit.

15. The training data generation method according to claim 14, the processing further comprising:

training a machine learning model with the spatial distribution of the current as a feature and the electromagnetic wave emission state as an objective variable using a set of the training data.

* * * * *